W. J. & R. CASE.
Harvester Rake.
No. 55,059.
2 Sheets—Sheet 1.
Patented May 29, 1866.
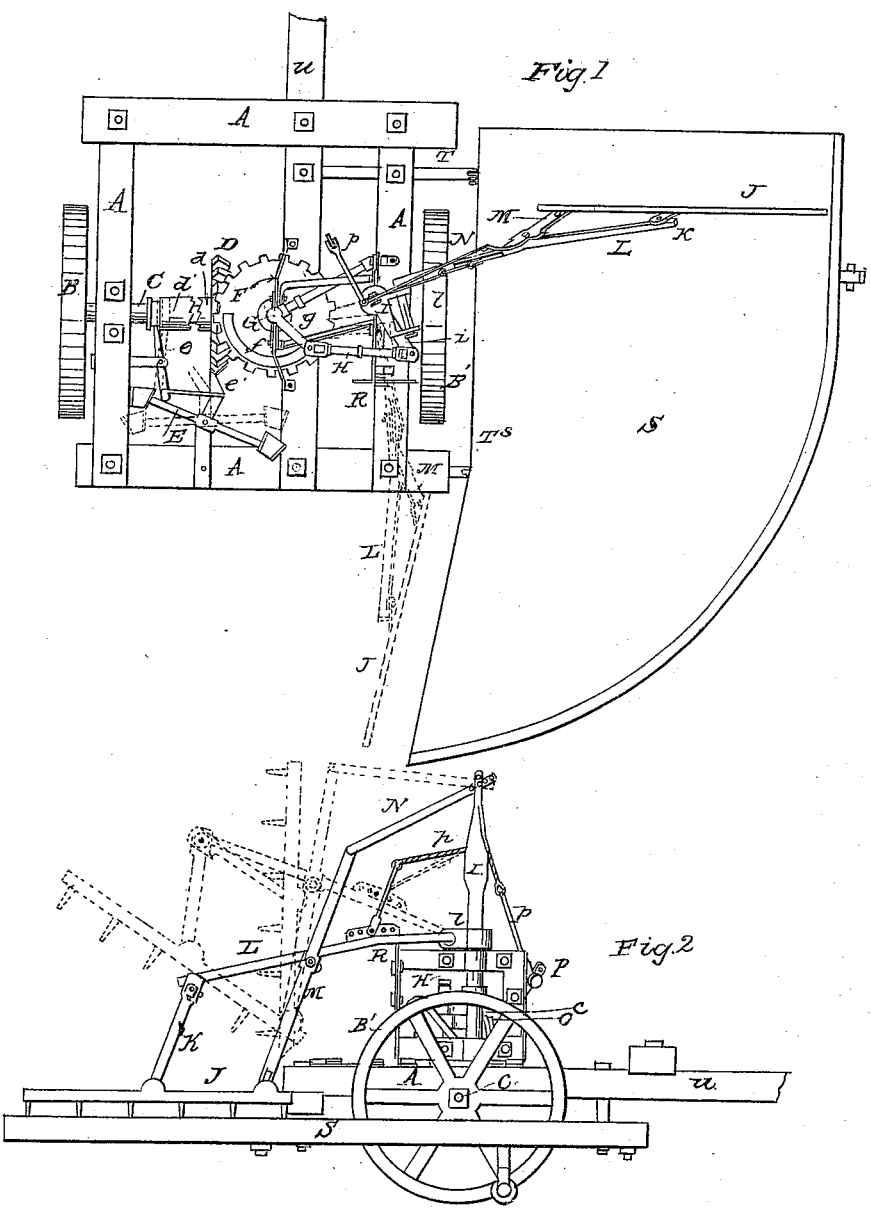
Witnesses
Inventor W. J. & R. CASE.
Harvester Rake.
No. 55,059.
2 Sheets—Sheet 2.
Patented May 29, 1866.
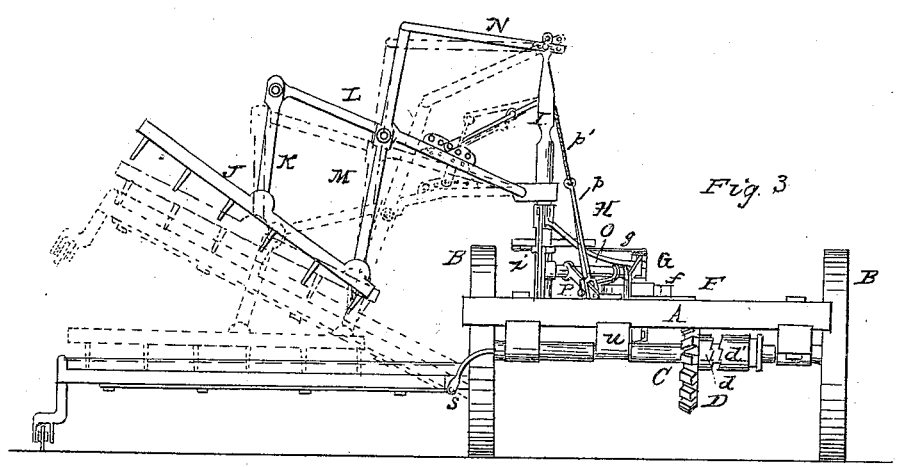
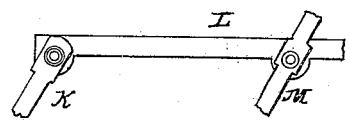
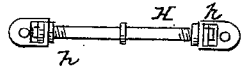
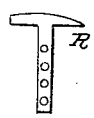
Witnesses
Inventor

UNITED STATES PATENT OFFICE.

WILLIAM J. CASE AND RHUTSON CASE, OF PITTSTOWN, NEW JERSEY.

IMPROVEMENT IN HARVESTER-RAKES.

Specification forming part of Letters Patent No. 55,059, dated May 29, 1866.

*To all whom it may concern:*

Be it known that we, WILLIAM J. CASE and RHUTSON CASE, both of Pittstown, in the county of Hunterdon and State of New Jersey, have invented a new and useful Improvement in Harvester-Rakes, of which the following is a full, clear, and exact description, reference being had to the accompanying drawings, which make part of this specification, and in which—

Figure 1 represents a plan or top view of so much of a harvesting-machine to which our improvement is applied as is necessary to illustrate our invention, the black lines showing the attitude assumed by the parts when the rake has dropped upon the platform preparatory to commencing its backward stroke, while the red lines show the position of the rake just after discharging the gavel. Fig. 2 represents a view, in elevation, of the machine as seen from the divider side, the black lines showing the rake just after discharging the gavel, the red lines its position when raised, and the blue lines show the rake as turned up and locked for transportation. Fig. 3 represents a similar view of the machine as seen from the front. Fig. 4 represents the journals or pivots of the rake-arms. Fig. 5 represents the rake-pitman detached; Fig. 6, the support for the rake after discharging the gavel, and Fig. 7 the rocking lever for lifting the rake.

The invention herein claimed consists, first, in connecting the rake to its driving-shaft or prime mover (rigidly mounted upon the main frame) by means of a system of levers arranged to act like a parallel rule, whereby we preserve the parallelism of the platform and rake while allowing each to conform freely to the undulations of the ground traversed by the machine; secondly, in a novel device for vibrating the rake; thirdly, in so combining the rake head and arms that they shall incline forward at a slight angle from the perpendicular, in order to strike close to the cutters without hitting the reel when harvesting short grain; fourthly, in a novel clutch and locking-lever for connecting and disconnecting the rake-gearing; fifthly, in a guide or support arranged to sustain the rake after passing beyond the back of the platform; sixthly, in a device for varying the length of stroke of the rake; seventhly, in forming the joints of the rake-arms with socket-journals to prevent friction; eighthly, in a device for folding up the rake, so that it may be carried upon the main frame when not in use, so as to allow the finger-beam and platform to be folded up to the frame to pass through gates, &c.; ninthly, in combining with a hinged platform a self-locking automatic rake so located upon the main frame as to enable the platform and cutting apparatus to be folded up for transportation.

In the accompanying drawings, which exemplify one convenient mode of carrying out the objects of our invention, a stout main frame, A, is shown as supported upon two wheels, B B', either or both of which may act as drivers. In this instance both wheels turn upon the same axle, C, the outer one, B, being keyed fast to and turning with it, while the inner one, B', plays loosely on the axle. A bevel-wheel, D, turns loosely on the main axle, but is prevented from moving endwise on the shaft by a suitable stop. This wheel is thrown into and out of gear by a sliding sleeve or clutch, $d$, moving freely endwise upon the shaft and made to turn with it, by means of a groove and pin, in the usual way, and provided with a feather taking into a corresponding one on the collar $d$.

The clutch is controlled by a lever, $e$, one end of which is forked, and embraces a groove in the sliding clutch, while its other end is connected to an arm projecting from a balance-lever, E, which is controlled by the feet of the driver, who occupies a seat on the rear of the frame, which seat is omitted from the drawings.

By reference to Fig. 1 it will be seen that the end of the arm $e$, when the rake is thrown out of gear, enters between the cogs of the bevel-wheel D and prevents it moving, while the same movement that throws the rake into gear withdraws the arm and leaves the gearing free to revolve.

The bevel-wheel D drives a corresponding pinion, F, on a short vertical shaft, G, carrying a crank, $g$, which is connected to a corresponding arm, $i$, on the turning post I, by a pitman, H. The rake-head J is pivoted near its center, so as to play freely vertically, to a link, K, in like manner pivoted to an arm, L, also moving vertically in its journals $l$ in the crane-post I. A balance-lever, M, is pivoted to the arm L near their centers, its lower end being pivoted to the inner end of the rake-head, while its upper end is connected by a link-rod, N, to the top of the crane-post.

A horizontal rock-shaft, O, mounted in suitable bearings on the frame, carries an arm, P, and pivoted link $p$, to which a cord, rope, or chain, $p'$, is attached. This cord passes over a pulley in the crane-post, and is connected to rake-arm L for the purpose of raising and lowering the rake. The rising and falling movements of the rake are produced by a cam, $f$, extending about one-third of the way around the back of the bevel-gear F, which acts upon a tappet or wiper, $o$, on the rock-shaft O.

By reference to Fig. 5 it will be seen that the pitman H screws into a socket, $h$, at each end, and that the screw-threads are so cut that when the pitman is screwed one way the distance between the sockets is increased, and that when turned the other way it is diminished. The effect of this is to throw the rake farther forward on its forward stroke and to restrict the extent of its backward movement, which enables us to adapt the rake to the varying length of the stalks.

In Fig. 1 it will be seen that the rake-arms are bent so as to cause them to incline slightly forward to enable the rake to strike close to the finger-beam to reach short grain without striking the reel.

To prevent strain on the rake-arms we place a rest or stand, R, Fig. 6, on the back of the frame, upon which the arm L slides at the end of the back stroke, so as to support the rake after it leaves the platform, as shown by red lines in Fig. 1 and by black ones in Fig. 2. This standard, as well as the other parts of the mechanism, it will be seen, is rendered adjustable whenever required by holes or pins, or in any other well-known way.

The platform S may be hinged to the main frame by joints $s$ and rigid coupling-arms T, or the coupling-arms may be yielding.

To prevent strain or friction on the joints of the rake, we form thimbles $l'$ on the arm L, Fig. 4, and pivot the levers K M on them and secure them in place by bolts and screws, instead of having the arms pivoted directly on the bolt. The machine is drawn and guided by a rigid tongue, U, projecting from the front of the frame.

We have described only so much of the machine as relates to our invention; but it is obvious that in operation we would use a suitable reel-gearing, cutting apparatus, divider, and all other parts essential to a completely-organized harvester of the present day.

The operation is as follows: In Fig. 1 the rake is shown as thrown out of gear at the moment of commencing its backward stroke. The red lines in Fig. 3 also show the rake in this position. The driver throws the rake into gear by moving the foot-lever E, as shown in red in Fig. 1. The pinion F revolves in the direction shown by the arrow in Fig. 1, and the movement of the crank $g$ causes the crane-post to make a quarter-turn from front to rear, drawing the grain back and discharging it from the rear of the platform behind the inner wheel and at right angles to the swath, where it is in a position convenient for binding and is out of the way of the team in cutting the next swath. As the rake passes off the back of the platform its arm L rests upon the standard R, which supports it and prevents strain upon the rake. This position is shown in red in Fig. 1 and in black in Fig. 2. As the gavel is discharged the cam $f$ strikes the tappet $o$ and turns the rock-shaft O, which, through its arm P and cord $p'$, lifts the rake into the position shown by red lines in Fig. 2. During this movement the crank $g$ is passing its dead-center and the forward movement of the rake is consequently suspended. After being lifted, however, the crank throws the rake rapidly forward (by turning the crank-post) until it reaches the position shown by the black lines in Fig. 3, at which moment the tappet $o$ passes off from the cam and the rake drops into the position shown in Fig. 1, its forward inclination enabling it to go close to the finger-beam without striking the reel. The movements above described are then repeated.

Should the platform be tilted, as shown by the red lines in Fig. 3, the rake, through its yielding joints, would immediately conform to such inclination and still work with its teeth parallel to the platform, as shown in blue in Fig. 3, and this would also be true were the inclination the other way. This feature is of great importance, as it enables us to secure the contact of the teeth with a hinged platform while using a rigid rake-post mounted on the main frame without connecting the rake and platform by levers, or mounting the rake upon the hinged finger-beam, as has heretofore been done.

In transporting the rake from place to place we can move it into the position shown in red lines in Fig. 2 and then turn the rake up vertically by hand, as shown in blue, when the arm K will be flexed inward and will hold the rake firmly in position. The platform may then be tilted up at any angle and held by suitable devices to enable the machine to pass through gates, &c.

What we claim as our invention, and desire to secure by Letters Patent, is—

1. The combination of a vibrating sweep rake with a crane-post rigidly secured to and turning upon the main frame by means of a system of levers forming a parallel-rule joint, substantially in the manner described, for the purpose of enabling the rake to conform to the undulations of a hinged platform without the use of a connection between the rake and platform, as set forth.

2. The combination, with the rake, of the bevel-gear F, cam $f$, tappet $o$, rock-shaft O, and arm P, as described, for the purpose of raising and lowering the rake.

3. The combination of the rake and crane-post by means of inclined arms, arranged and operating substantially as described, to enable the rake to strike close to the finger-beam.

4. The combination of the clutch-lever $e$ with the locking-arm $e'$, when arranged and operating as described, for the purpose of simultaneously uncoupling the rake and locking its driving-wheel.

5. The guide R, to support the rake after discharging the gavel.

6. The arrangement between the cranks $g$ $i$ of the adjustable pitman H, as described, for the purpose of varying the stroke of the rake, as set forth.

7. The combination of the levers K M with the rake-arms by the socket-joints $l'$, as set forth.

8. The combination of the rake-head with a system of levers, substantially as described, for the purpose of locking the rake in a vertical position over the frame for transportation, as set forth.

9. The combination, substantially in the manner described, of the hinged platform with the self-locking automatic rake so located upon the main frame as to enable the finger-beam to be folded up for transportation.

In testimony whereof we have hereunto subscribed our names.

WILLIAM J. CASE.
RHUTSON CASE.

Witnesses:
C. BARTLES,
JOHN B. HOPEWELL.